United States Patent
Tsuchida et al.

(10) Patent No.: US 7,124,539 B2
(45) Date of Patent: Oct. 24, 2006

(54) WEATHER STRIP

(75) Inventors: Hideshi Tsuchida, Hiroshima (JP); Tsuyoshi Noda, Aichi (JP)

(73) Assignees: Mitsubishi Jidosha Kogyo Kabushikikaisha, Tokyo (JP); Nishikawa Rubber Co., Ltd., Hiroshima (JP)

( * ) Notice: Subject to any disclaimer, the term of this patent is extended or adjusted under 35 U.S.C. 154(b) by 259 days.

(21) Appl. No.: 10/819,720

(22) Filed: Apr. 7, 2004

(65) Prior Publication Data
US 2004/0255519 A1 Dec. 23, 2004

(30) Foreign Application Priority Data
Apr. 8, 2003 (JP) .............................. 2003-104504

(51) Int. Cl.
*E06B 7/16* (2006.01)
*B60J 10/08* (2006.01)

(52) U.S. Cl. .................................. 49/490.1; 296/146.9

(58) Field of Classification Search ............... 49/490.1, 49/475.1, 483.1, 498.1, 479.1, 495.1; 428/36.9, 428/122; 296/146.9, 146.2; 277/921, 637, 277/642, 645; 52/716.5; 264/259, 261, 264/250, 255
See application file for complete search history.

(56) References Cited

U.S. PATENT DOCUMENTS

| | | | | |
|---|---|---|---|---|
| 3,958,369 A | * | 5/1976 | Mathellier | 49/479.1 |
| 4,183,778 A | * | 1/1980 | Mesnel | 264/261 |
| 4,769,947 A | * | 9/1988 | Ogawa et al. | 49/479.1 |
| 4,884,370 A | * | 12/1989 | Nozaki et al. | 49/479.1 |
| 5,127,193 A | * | 7/1992 | Okada et al. | 49/495.1 |
| 5,258,157 A | * | 11/1993 | Nozaki et al. | 264/261 |
| 5,269,101 A | * | 12/1993 | Nozaki et al. | 49/479.1 |
| 5,374,386 A | * | 12/1994 | Nagata | 264/259 |
| 5,566,510 A | * | 10/1996 | Hollingshead et al. | 49/479.1 |
| 5,972,268 A | * | 10/1999 | Nakajima et al. | 264/261 |
| 6,007,753 A | * | 12/1999 | Nagata | 264/259 |
| 6,395,355 B1 | * | 5/2002 | Nakajima et al. | 428/34.1 |
| 6,571,514 B1 | * | 6/2003 | Aritake | 49/490.1 |
| 6,598,347 B1 | * | 7/2003 | Hattori | 49/479.1 |
| 6,716,496 B1 | * | 4/2004 | Nakajima et al. | 428/34.1 |
| 6,786,007 B1 | * | 9/2004 | Aritake | 264/250 |

* cited by examiner

Primary Examiner—Hugh B. Thompson, II
(74) Attorney, Agent, or Firm—Flynn, Thiel, Boutell & Tanis, P.C.

(57) ABSTRACT

A weather strip includes a body side weather strip and an inner seal attached to opposite ends of a die formed part for use at a door opening edge of a car body. The inner seal has a grip with an embedded metal core for insertion into a body flange. The upper end of the inner seal is formed as a cut end face that connects to die formed part and a gap exists between a roughly triangular base part of the die formed part and at a lip a side surface of the upper end part of the inner seal. When the inner seal attaches to the flange it is curved along the flange and the side end of the base part contacts the inner seal upper end part to close the gap.

13 Claims, 5 Drawing Sheets

WEATHER STRIP

The present invention relates to a weather strip formed by integrating a body side weather strip and an inner seal of the lower side, which are attached to the door opening edge of the body of automobiles, in particular, hardtops and open top cars, at a die formed part.

BACKGROUND OF THE INVENTION

At the door opening edge of a body of a hardtop car as shown in FIG. 3 or an open top car that is not shown, a body side weather strip is attached above the belt line BL and an inner seal is attached to the lower side below the belt line, and recently, in order to improve sound insulation at the connecting part between the body side weather strip and the inner seal and improve the external appearance of the connecting part, integration of the body side weather strip and the inner seal by a die formed part has increased.

FIG. 4 shows an example of this integration, wherein the reference numeral 1 denotes a body side weather strip, and 2 denotes an inner seal. Furthermore, the reference numeral 3 denotes a die formed part at a corner, 4 and 5 denote die formed parts integrated a body side weather strip 1 and an inner seal 2.

FIG. 5 shows a weather strip 6 to be attached to a part below the belt line BL of the door D shown in FIG. 3, wherein die formed parts 8 and 9 are formed at the respective upper left and upper right ends.

FIG. 6 shows the positional relationship of the body side weather strip 1, the inner seal 2, and the weather strip 6 when the door D is closed, wherein the upper edge of a door glass 7 shown in FIG. 3 comes into elastic contact with and is sealed by the weather strip 1, the weather strip 6 comes into elastic contact with and seals the door opening edge of the body side, and the die formed parts 8 and 9 at the upper ends of the weather strip 6 come into elastic contact with and seal the respective die formed parts 4 and 5 that are formed by integrating the body side weather strip 1 and the inner seal 2.

FIG. 7 shows the die formed part 4 integrated with the body side weather strip 1 and the inner seal 2 of FIG. 4. Regarding triangle marks in this figure, the daub over side indicates a die formed part, and the outlined side indicates an extruded part. The same applies to the figures described below.

The following methods have been conventionally used as a method for forming the abovementioned die formed part 4 onto the inner seal end.

In a first method, the inner seal end is set at a die end and the die formed part 4 is formed as shown in FIG. 7, and in a second method, the inner seal 2 is partially extended as shown in FIG. 8 and the die formed part 12 is formed at this extended portion. However, these methods have the following problems.

The inner seal 2 has a grip 13 having a roughly U-shaped section which is inserted into and attached to a flange (not shown) of the body as shown in FIG. 7, and a core metal 14 having a roughly U-shaped section is embedded inside the grip 13, however, since the core metal is not embedded in the grip of the die formed part 4 which is formed continuously from the grip 13 of the inner seal 2, in a case where the grip 13a of the die formed part 4 is inserted into and attached to the body flange, the gripping force of the grip 13a becomes insufficient and it cannot be securely attached to the body flange.

In the die formed part shown in FIG. 8, since the grip 13 with an embedded core metal of the inner seal 2 is extended to the die formed part 12 side, its attachment performance to the body flange becomes higher than that of FIG. 7, however, the joint surface to be joined with the die formed part 12 must be a cut surface so as to improve adhesiveness to the die formed part 12 and prevent it from easily peeling. Therefore, it becomes necessary that a part of the inner seal 2 other than the grip is cut in a stepped pattern. Furthermore, since the inner seal 2 is curved according to the curve of the body flange, the inner seal must be set in the curved condition in a die, however, setting in the curved condition is troublesome due to the embedded core metal.

An object of the invention is to solve the abovementioned problem and improve attachment performance to the body flange and forming workability of the die formed part in a weather strip to be attached to the door opening edge of a body of a hardtop or an open top car.

SUMMARY OF THE INVENTION

The weather strip relating to the invention is formed by integrating a body side weather strip and an inner seal of the lower side, which are attached to the door opening edge of a body of automobiles, in particular, hardtop and open top cars, at a die formed part, wherein the inner seal has a grip with a metal core embedded which is inserted into and attached to the body flange, and the upper end is formed to be a cut end face. The die formed part is formed so that it is partially absent and the absent portion houses the upper end part of the inner seal, the die formed part is connected to only the cut end face of the inner seal upper end and has a gap from the side surface of the inner seal upper end, and when the die formed part is inserted and attached to a body flange together with the inner seal, it can be joined with the side surface of the inner seal upper end.

In the invention, since a grip with a core metal embedded is extended inside the absent portion of the die formed part, the problem of insufficient gripping force to the flange is eliminated. Furthermore, when forming the die formed part at which the body side weather strip and the inner seal at the lower side are integrated, without cutting in a stepped pattern or curving the upper end part of the inner seal, the inner seal can be set in a die as it is, so that workability in forming the die formed part is excellent.

The width of the abovementioned gap is allowed to be either fixed or changed, however, preferably, the gap has a wedge shape the width of which narrows toward the front end of the inner seal and a die that is inserted in this wedged gap is easily extracted.

Herein, the wedged gap not only includes a gap formed by crossing two straight lines at an acute angle, but also includes a gap whose die formed part side is curved as shown in the following embodiment.

By providing the abovementioned gap, the inner seal can be curved along the flange shape of the door, so that it is not necessary that the inner seal is formed in advance in accordance with the flange shape of the door.

Regarding the die formed part of the weather strip of the invention, not only the die formed part 15 shown in FIG. 4 but also the die formed part 5 of the rear side of the automobile can be integrated in the same method.

Other features and effects of the present invention will be more clearly understood in the following detailed description of the embodiments by those skilled in the art. It must be, however, noted that the technical scope of the present invention is not limited to the embodiments and the accompanying drawings alone.

DESCRIPTION OF THE PREFERRED EMBODIMENT

Figure 1:
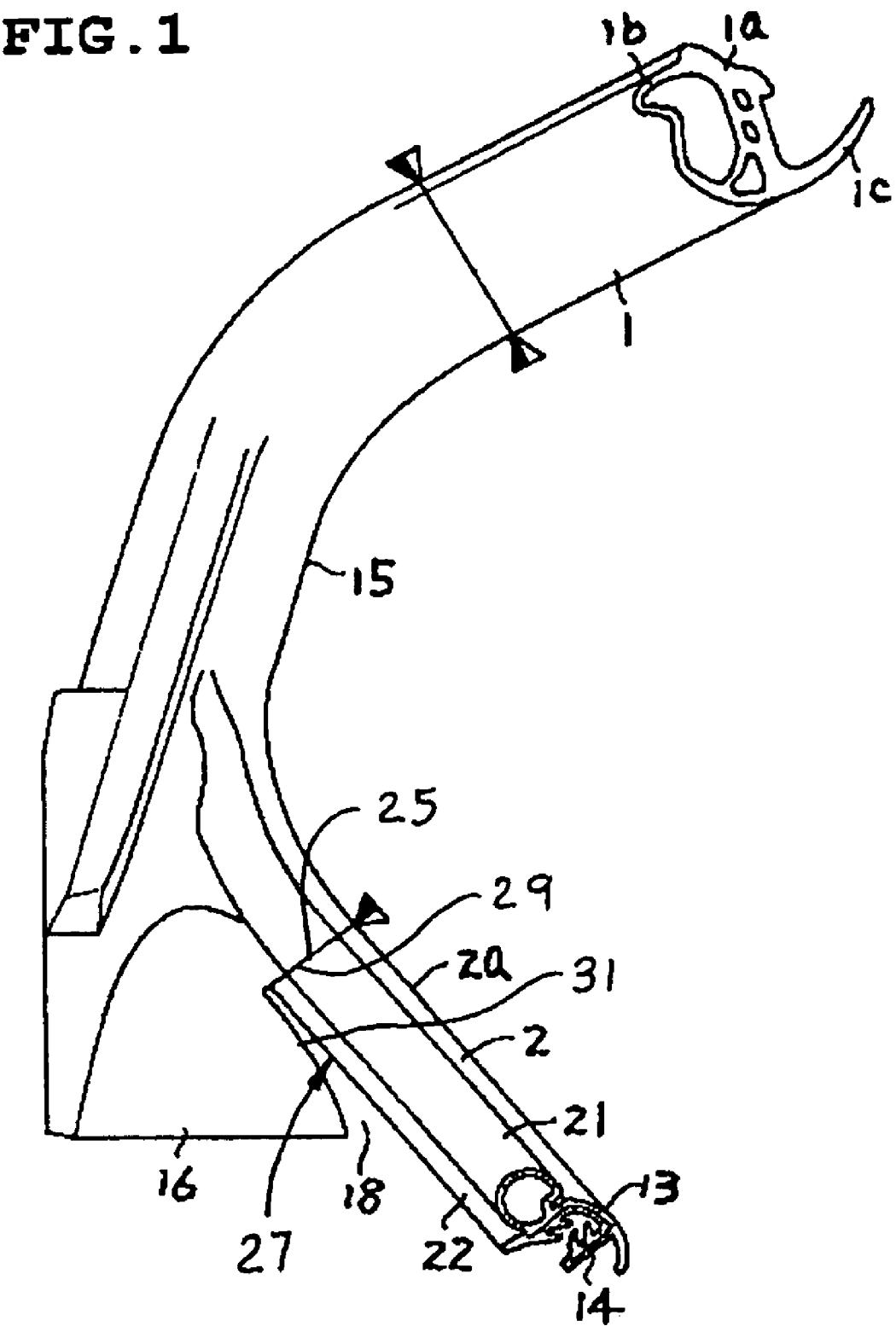
FIG. 1 is a drawing showing a main part of a weather strip relating to the invention.
Figure 2:
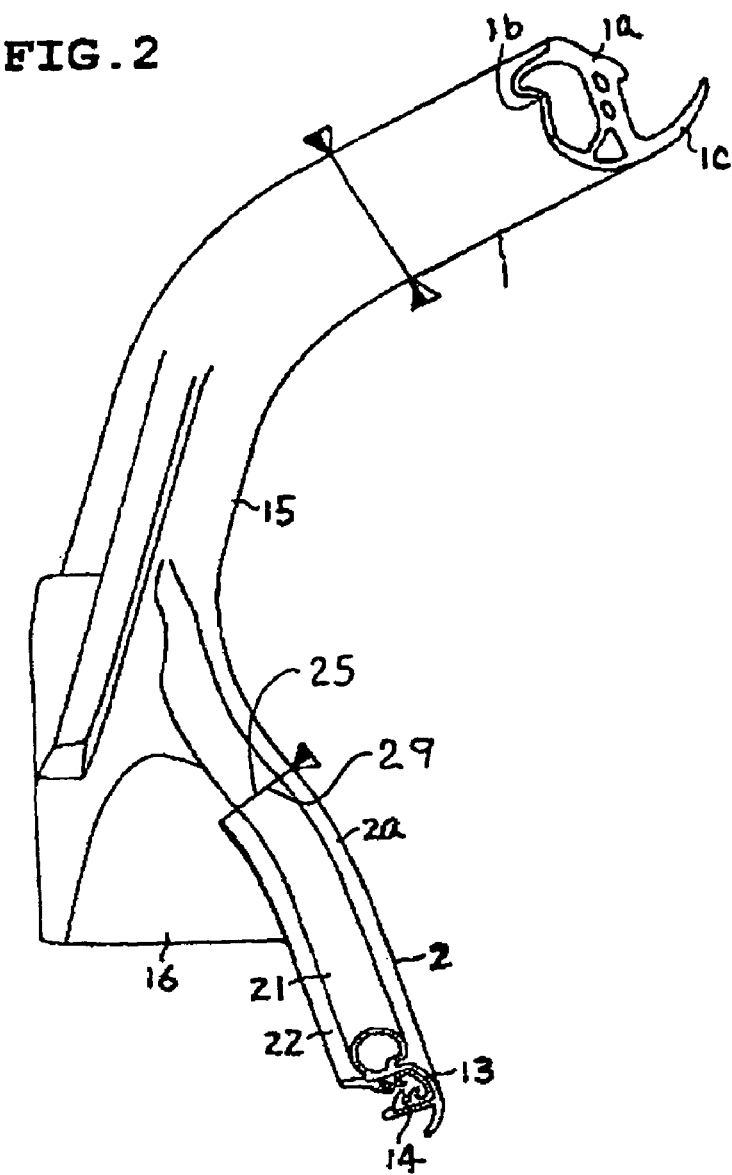
FIG. 2 is a drawing showing a condition where the weather strip shown in FIG. 1 is attached to a flange.
Figure 3:
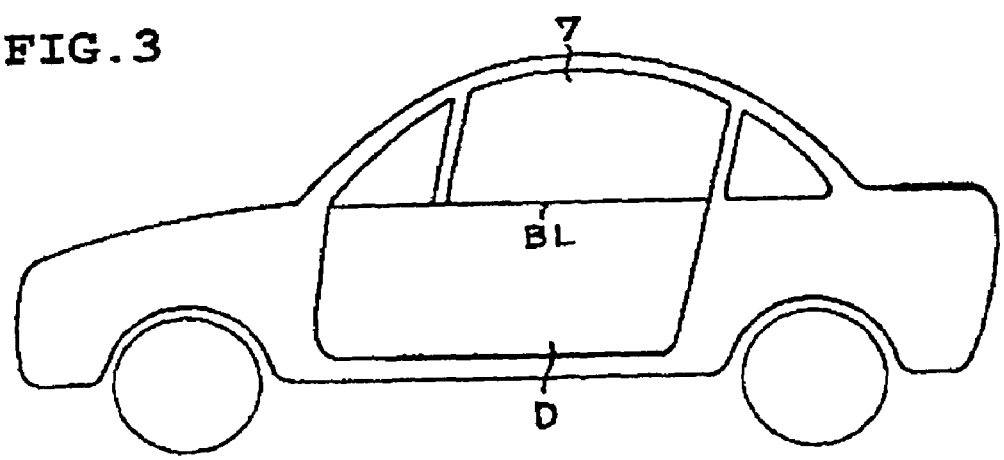
FIG. 3 is a side view of a hardtop.
Figure 4:
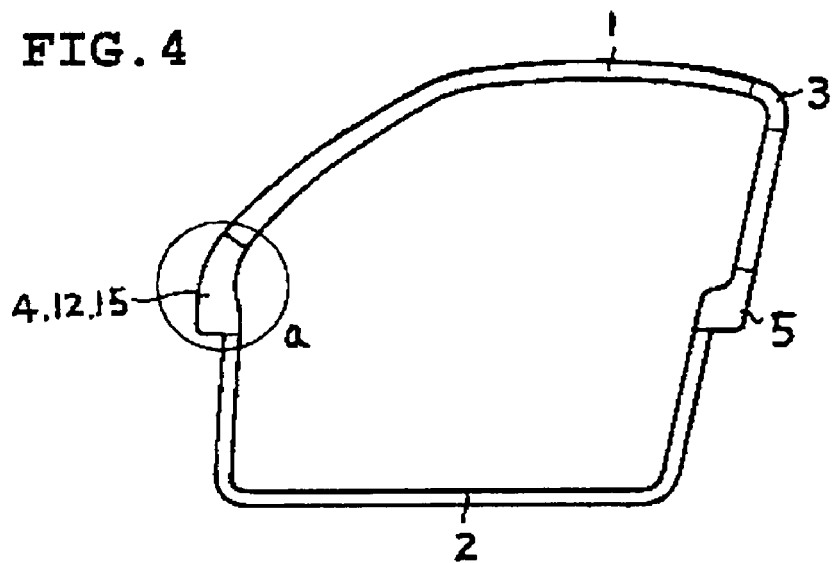
FIG. 4 is a drawing showing the entirety of a weather strip to be attached to the door opening edge of a body.
Figure 5:
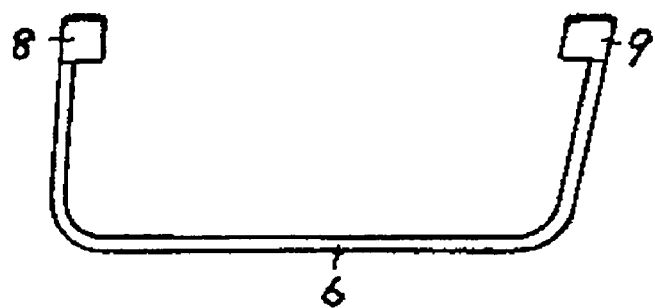
FIG. 5 is a drawing showing a weather strip to be attached to a lower part below a belt line of the door.
Figure 6:
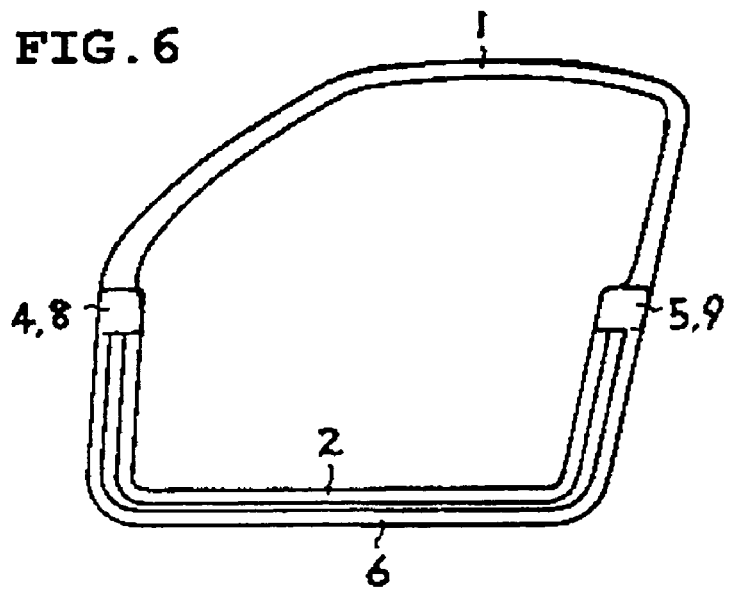
FIG. 6 is a drawing showing the positional relationship between the weather strip shown in FIG. 4 and the weather strip shown in FIG. 5 when the door is closed.
Figure 7:
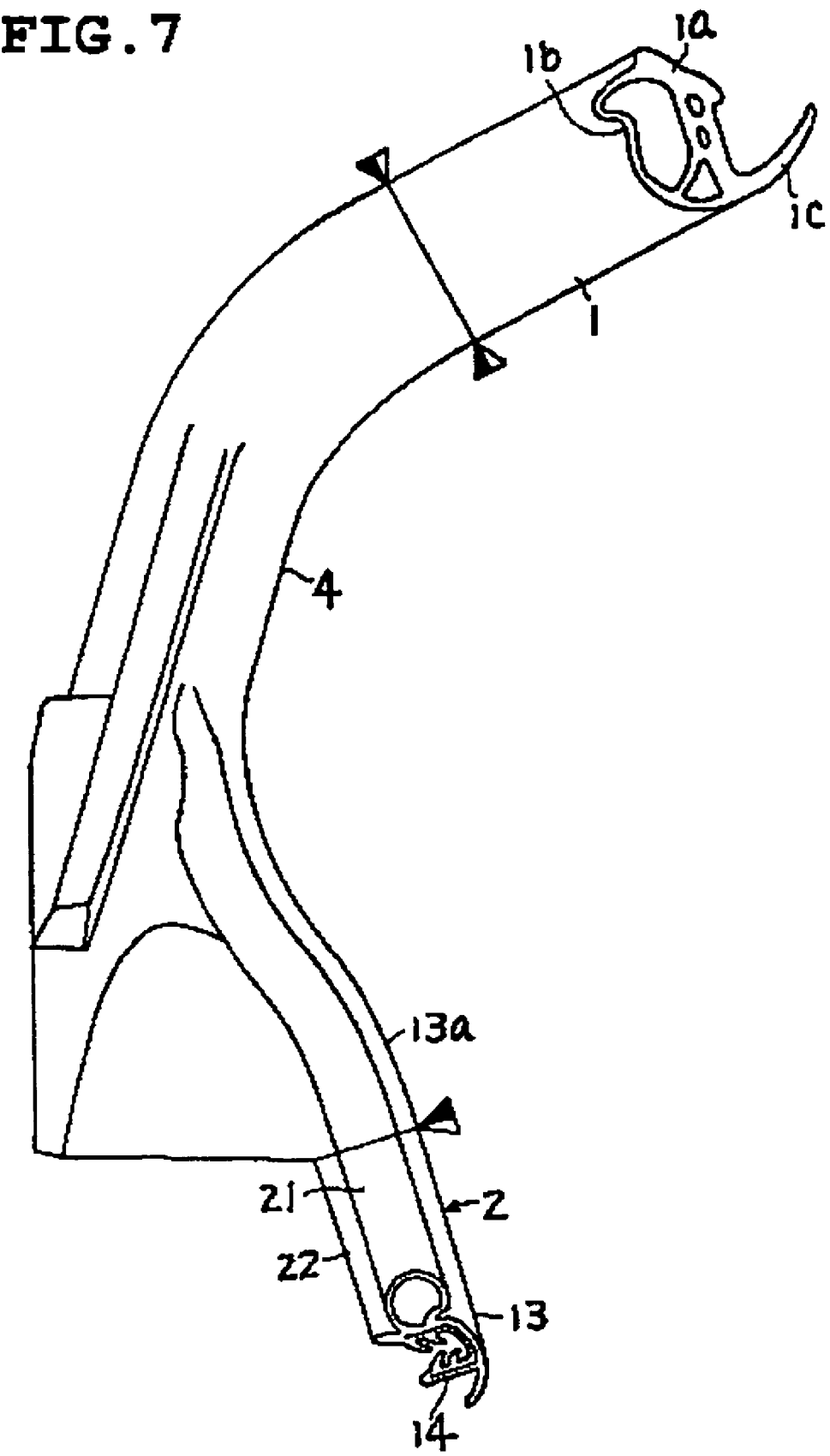
FIG. 7 is an enlarged view of a die formed part at which a body side weather strip and an inner seal are integrated.
Figure 8:
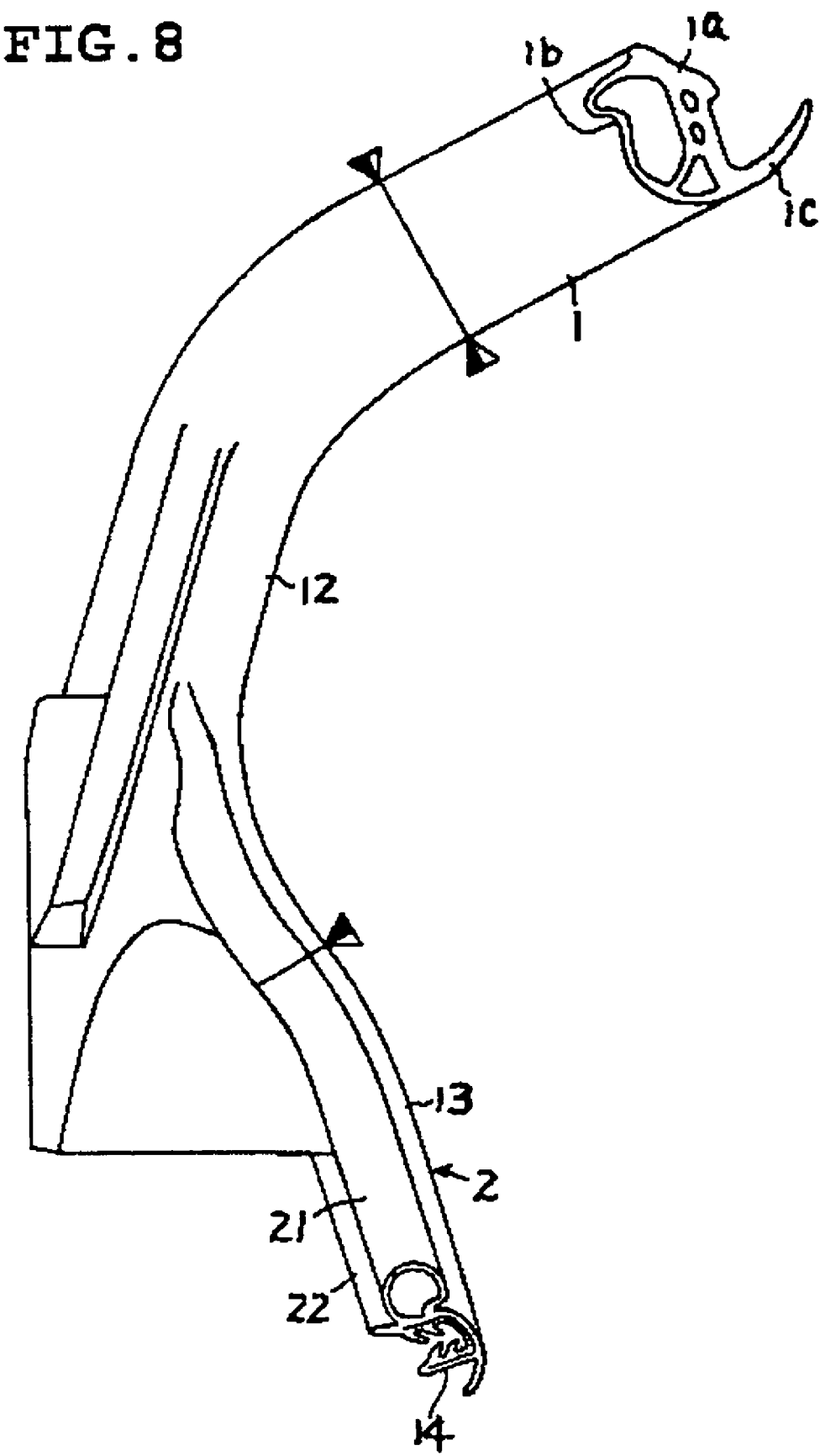
FIG. 8 is an enlarged view of a conventional die formed part at which a body side weather strip and an inner seal are integrated.

FIG. 1 and FIG. 2 show the section a of the weather strip shown in FIG. 4, and in these figures, components having the same structures as in the weather strips shown in FIG. 7 and FIG. 8 are indicated by the same symbols.

A body side weather strip 1 comprises an attaching base part 1a to be attached to a retainer attached to the door opening edge of a body that is not shown, a hollow seal part 1b which is provided to project from the attaching base part 1a, and comes into elastic contact with a door glass 7 and seals the door glass 7 when the door D is closed, and a lip piece 1c which comes into elastic contact with a body interior material (not shown), and covers the abovementioned retainer that is not shown and the attaching base part 1a of the weather strip 1. An inner seal 2 comprises a grip 13 with a core metal 14 embedded which is inserted into a flange (not shown) of the body, a hollow seal part 21 which is provided so as to project sideward from the grip, and comes into elastic contact with and seals the door when the door D is closed, and a lip 22 which comes into elastic contact with the body.

A die formed part 15 at which the body side weather strip 1 and the inner seal 2 of the lower side are integrated is formed so that a part including the extended portion of the inner seal is absent, the absent portion houses the straight-shaped inner seal upper end part 2a of the inner seal 2, the die formed part is connected to only the cut end face 25 at the upper end 29 of the inner seal upper end part 2a, and a wedged gap 18 the width of which narrows toward the upper end of the inner seal 2 is created between a roughly triangular base part 16 and the lip 22 at the upper end side surface 27 of the inner seal 2, and the side end 31 of the base part 16 that forms the wedged gap 18 is curved along a flange.

FIG. 2 shows a condition where the inner seal 2 integrated with the body side weather strip 1 by the die formed part 15 is curved along the flange and attached to the flange, wherein as the inner seal is attached to a flange, the inner seal upper end part 2a is joined with the side end 31 of the base part to eliminate the gap 18.

What is claimed is:

1. A weather strip which is formed by integrating a body side weather strip and an inner seal of a lower side, and is configured to be attached to a door opening edge of a body of an automobile, by a die formed part, the inner seal having a grip part with an embedded metal core adapted for insertion and attachment to a body flange of a body of an automobile, wherein the die formed part is formed to receive an inner seal upper end part of said inner seal, the die formed part being connected to only a cut end face at an upper end of the inner seal upper end part, and the die formed part having a wedge shaped gap from a side surface of the inner seal upper end part, wherein the width of said wedge shaped gap narrows toward the upper end of the inner seal upper end part, the die formed part together with the inner seal being adapted so that insertion into a body flange is capable of closing the gap between the die formed part and the side surface of the inner seal upper end part.

2. The weather strip according to claim 1, wherein the inner seal connected to the die formed part is shaped straight.

3. A weather strip comprising:

a body side weather strip including a hollow seal part and a lip piece;

an elongate inner seal comprising a hollow seal part extending the length thereof and a grip with a metal core embedded therein capable of attachment to a body flange, and the inner seal having an upper end part with an upper end cut end face at an upper end thereof; and an elongate die formed part having a first end joined to the body side weather strip and a second end joined to the upper end cut end face at an upper end of the inner seal to integrally join the body side weather strip and the inner seal, the die formed part having a base part projecting from the second end to form a gap between the inner seal and the base part, whereby the gap is capable of being closed by mounting of the weather strip to a vehicle body.

4. The weather strip according to claim 3, wherein the gap comprises a wedged gap.

5. The weather strip according to claim 3, wherein the base part comprises a triangular shaped base part.

6. The weather strip according to claim 3, wherein the upper end cut end face comprises a flat upper end cut end face.

7. The weather strip according to claim 3, wherein the base part facing the gap is curved.

8. The weather strip according to claim 3, wherein the inner seal and the body side weather strip are extruded.

9. The weather strip according to claim 3, wherein the inner seal is shaped straight.

10. The weather strip according to claim 9, wherein the gap comprises a wedged gap.

11. The weather strip according to claim 10, wherein the base part comprises a triangular shaped base part.

12. The weather strip according to claim 11, wherein the upper end cut end face comprises a flat upper end cut end face.

13. The weather strip according to claim 12, wherein the base part facing the gap is curved.

* * * * *